United States Patent [19]
Nilssen

[11] Patent Number: 5,999,432
[45] Date of Patent: *Dec. 7, 1999

[54] HIGH-EFFICIENCY BRIDGE INVERTER

[76] Inventor: Ole K. Nilssen, Caesar Dr., Rte. 5, Barrington, Ill. 60010

[ * ] Notice: This patent issued on a continued prosecution application filed under 37 CFR 1.53(d), and is subject to the twenty year patent term provisions of 35 U.S.C. 154(a)(2).

[21] Appl. No.: 08/124,856

[22] Filed: Sep. 22, 1993

Related U.S. Application Data

[63] Continuation of application No. 07/221,027, Jul. 18, 1988, abandoned, and a continuation-in-part of application No. 07/831,086, Feb. 7, 1992, Pat. No. 5,180,952, which is a continuation-in-part of application No. 07/611,334, Nov. 13, 1990, abandoned, which is a continuation of application No. 07/484,278, Feb. 2, 1990, abandoned, which is a continuation-in-part of application No. 07/387,370, Jul. 31, 1989, abandoned, which is a continuation of application No. 07/108,963, Oct. 16, 1987, abandoned, which is a continuation of application No. 06/741,132, Jun. 4, 1985, abandoned.

[51] Int. Cl.[6] .............................................. H02M 7/5387
[52] U.S. Cl. ............................................................ 363/132
[58] Field of Search ................................. 363/56, 58, 98, 363/132; 323/289; H02M 7/537

[56] References Cited

U.S. PATENT DOCUMENTS

| | | | |
|---|---|---|---|
| 4,408,267 | 10/1983 | Pruitt | 363/25 X |
| 4,464,710 | 8/1984 | Gruber | 363/22 |
| 4,502,107 | 2/1985 | Nilssen | 363/133 |
| 4,506,318 | 3/1985 | Nilssen | 363/132 |
| 4,513,364 | 4/1985 | Nilssen | 363/132 |
| 4,672,517 | 6/1987 | Mandelcorn | 363/98 X |
| 4,674,021 | 6/1987 | Sachs | 363/98 X |
| 4,677,345 | 6/1987 | Nilssen | 363/132 X |
| 4,706,177 | 11/1987 | Josephson | 363/98 X |
| 4,729,084 | 3/1988 | Kataoka | 363/98 X |
| 5,180,952 | 1/1993 | Nilssen | 315/210 |

FOREIGN PATENT DOCUMENTS

| | | | |
|---|---|---|---|
| 0025222 | 2/1977 | Japan | 363/56 |
| 0687549 | 9/1979 | Russian Federation | 363/132 |

OTHER PUBLICATIONS

Schroeder, "Analysis and Design of a Highly Efficient Power Stage for an 18–KHZ 2.5KW DC–DC Converter", IEEE, Jul. 1981, pp. 273–283.

*Primary Examiner*—Shawn Riley

[57] ABSTRACT

In a self-oscillating full bridge inverter, a small non-linear inductor is connected in series with the inverter's load. Tightly coupled with this inductor are four individual secondary windings, one for each of the inverter's four transistors. By way of a high-speed rectifier for each secondary winding, at the end of each half-cycle of the inverter's 20 kHz squarewave output voltage, the energy stored in the inductor is used for: i) rapidly sweeping out the charges from the collector-base junction of the transistor last to cease conducting of the two most recently conducting transistors, and ii) for preventing the obverse two transistors from becoming conductive until the most recently conducting two transistors have both fully ceased to be conductive. As a result, even with a purely resistive load, the transistors are affirmatively prevented from forming direct conduction paths across the DC source.

25 Claims, 3 Drawing Sheets

HIGH-EFFICIENCY BRIDGE INVERTER

This application is a continuation of Ser. No. 07/221,027 filed Jul. 18, 1988, now abandoned and a continuation-in-part of Ser. No. 07/831,086 filed Feb. 7, 1992, now U.S. Pat. No. 5,180,952; which is a continuation-in-part of Ser. No. 07/611,334 filed Nov. 13, 1990, now abandoned; which is a continuation of Ser. No. 07/484,278 filed Feb 26, 1990, now abandoned; which is a continuation-in-part of Ser. No. 07/387,370 filed Jul. 31, 1989, now abandoned; which is a continuation of Ser. No. 07/108,963 filed Oct. 16, 1987, now abandoned; which is a continuation of Ser. No. 06/741,132 filed Jun. 4, 1985, now abandoned.

BACKGROUND OF THE INVENTION

1. Field of the Invention

The present invention relates to electronic inverters, particularly to self-oscillating full bridge inverters using bipolar transistors.

2. Description of Prior Art

When a self-oscillating full bridge bipolar-type transistor inverter is loaded with an inductive load, after then end of each half-cycle of the inverter's high-frequency output voltage, current will continue to flow in the bridge for at least a short period after the two most recently conducting transistors have ceased conducting, yet before the obverse two transistors have started to conduct.

As a result of this lingering inductive current, the inverter's bipolar transistors will tend to switch off rapidly and therefore give rise to high-efficiency inverter operation.

However, when a self-oscillating bipolar-type full bridge inverter is used with a purely resistive load, no lingering inductive current results and low-efficiency inverter operation is apt to occur.

U.S. Pat. No. 4,502,107 to Nilssen describes a full bridge self-oscillating bipolar-type transistor inverter wherein the net inverter load is made inductive by the overt addition of an inductor in parallel with the inverter's otherwise resistive load. However, in order for this method to work well, there has to be a matching between the value of the inductor and the load; which requirement may represent a drawback in some applications.

General Purpose of Present Invention

The general purpose of the present invention is that of providing a basic design approach for a full bridge self-oscillating bipolar transistor inverter can be efficiently operated with a net load that is substantially resistive.

SUMMARY OF THE INVENTION

Objects of the Invention

An object of the present invention is that of providing a basic approach to designing a high-efficiency self-oscillating full bridge bipolar-type transistor inverter.

This as well as other objects, features and advantages of the present invention will become apparent from the following description and claims.

Brief Description

In its preferred embodiment, the invention is represented by bridge of four bipolar transistors; which bridge is powered from a source of DC voltage and operative to provide a squarewave voltage to a load. The bridge is made to self-oscillate at 20 kHz by way a saturable current transformer for each transistor. In response to the current flowing through the load, in positive feedback manner, each saturable current transformer provides drive current to the base-emitter junction of its associated transistor, the drive current having an instantaneous magnitude proportional to that of the load current. Thus, the bridge constitutes a substantially ordinary self-oscillating bridge inverter.

This ordinary bridge inverter comprises a first and a second pair of transistors; which pairs alternately conduct through the load. Just before the end of a given half-cycle of the inverter's squarewave output voltage, both transistors of the first pair of transistors are fully conducting. Shortly thereafter, in the ideal situation, both of these transistors suddenly cease to conduct, whereafter the other pair of transistors suddenly start conducting.

However, with real life components, the two transistors of the first pair do not cease conducting at the same time: one transistor will invariably cease to conduct before the other. (This may be due to the two transistors having different storage times.)

With a resistive load, as soon as but one of the transistors of a given pair stops conducting, output current ceases to flow; which means that collector current in the other transistor of that given pair also ceases to flow. Thus, we have a situation where the collector-base junction of this other transistor contains a substantial number of free-floating charges, but with no collector current to sweep them out.

With no collector current flowing, it may take 20 microseconds or more for these free-floating charges to recombine; which means that this transistor will remain conductive for that long.

Thus, within this 20 micro-second time frame, when the other pair of transistors are switched on, one of the transistors of the given pair is still conducting; which then gives rise to substantial dissipative current flowing directly from the DC source through one transistor of each of the two pairs of transistors. In turn, this gives rise to excessive inverter dissipation.

In accordance with the present invention, to eliminate this problem, a very small inductor is placed in series with the load, and—by way of four tightly coupled 1:1 secondary windings and four high-speed commutating diodes—the energy stored in this inductor at the end of each half-cycle is used for flushing out the free-floating charges in the collector-base junction of whichever transistor remaining conductive after the end of the half-cycle. Moreover, means are provided by which the non-conducting pair of transistors are prevented from being switched on before the charges have been fully removed from the last-to-conduct transistor of the obverse pair.

When the inductive energy is used for flushing out the collector-base junction, the voltage required for this flushing-out action is only on the order of one Volt or so; and the length of time it takes for the junction to be flushed out is only about one or two micro-seconds. Thus, the net amount of Volt-seconds required to be provided by the series-inductor is only on the order of a few Volt-micro-seconds. However, to accomodate component imperfections and wide variations in loading, a substantially higher amount of Volt-micro-seconds is actually provided for. Also, specifically to accommodate wide variations in load, the energy-storing inductor is made to be nonlinear, having a higher inductance at lower current levels.

DESCRIPTION OF THE PREFERRED EMBODIMENT

Details of Construction

Figure 1:
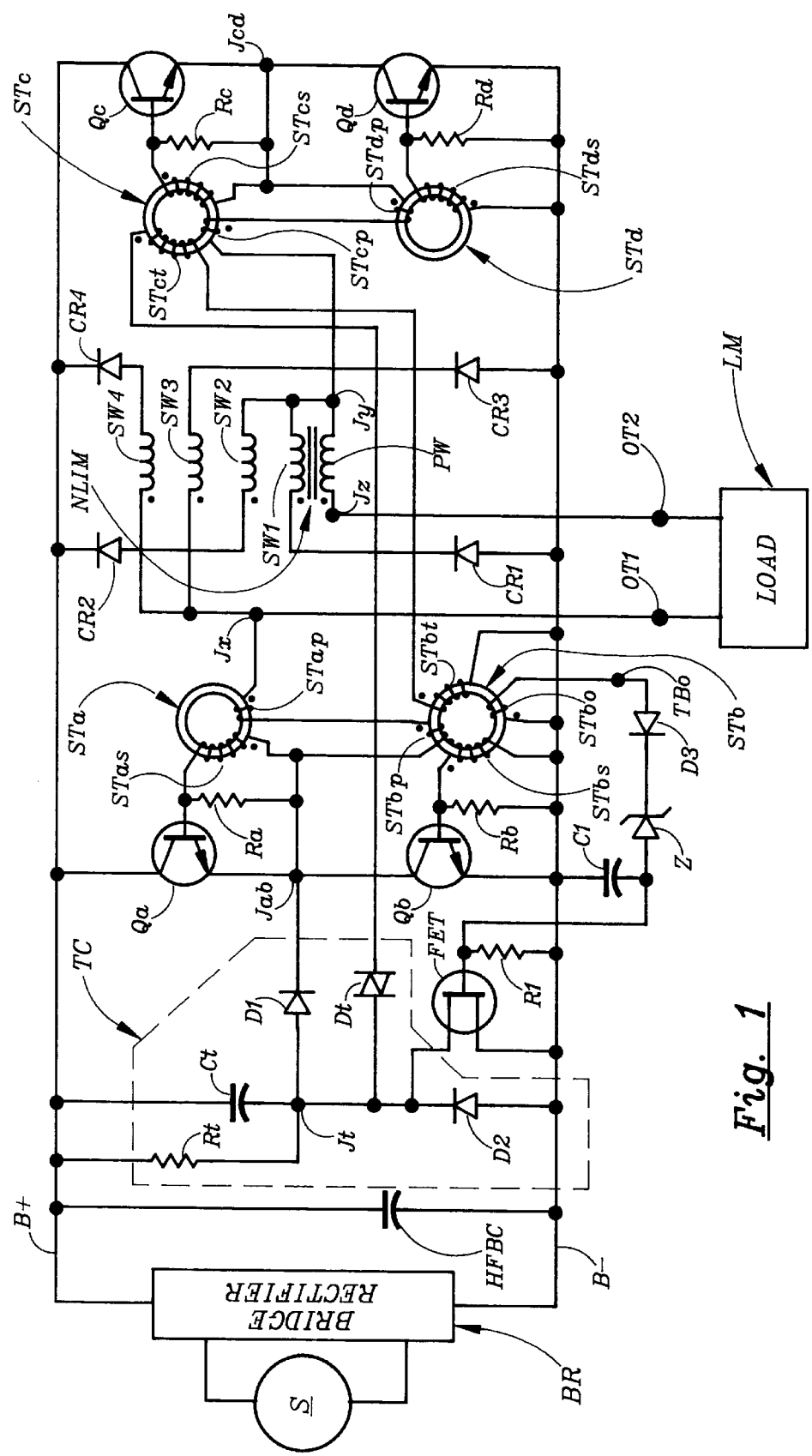
FIG. 1 diagrammatically illustrates the basic circuit arrangement of the invention in its preferred embodiment.

FIG. 1 schematically illustrates the basic electrical circuit arrangement of the preferred embodiment of the invention.

A source S provides 120 Volt/60 Hz power line voltage to a bridge rectifier BR. The DC output of the bridge rectifier is applied between a B+ bus and a B− bus. A high frequency bypass capacitor HFBC is connected between the B+ bus and the B− bus.

Four bipolar switching transistors Qa, Qb, Qc and Qd are connected in bridge configuration between the B+ bus and B− bus. The collector of Qa is connected with the B+ bus; the emitter of Qa is connected with the collector of Qb at a junction Jab; and the emitter of Qb is connected with the B− bus. Likewise, the collector of Qc is connected with the B+ bus; the emitter of Qc is connected with the collector of Qd at a junction Jcd; and the emitter of Qd is connected with the B− bus.

The secondary winding STas of a saturable transformer STa is connected across the base-emitter junction of transistor Qa; the secondary winding STbs of a saturable transformer STb is connected across the base-emitter junction of transistor Qb; the secondary winding STcs of a saturable transformer STc is connected across the base-emitter junction of transistor Qc; and the secondary winding STds of a saturable transformer STd is connected across the base-emitter junction of transistor Qd.

Resistors Ra, Rb, Rc and Rd are connected across the base-emitter junctions of transistors Qa, Qb, Qc and Qd, respectively.

The primary windings STap and STbp of saturable transformers STa and STb, respectively, are connected in series between a junction Jx and junction Jab. Similarly, the primary windings STcp and STdp of saturable transformers STc and STd are connected in series between a junction Jy and junction Jcd.

The primary winding PW of a non-linear inductor means NLIM is connected between junction Jy and a junction Jz. A first secondary winding SW1 is connected between junction Jy and the cathode of a first commutating rectifier CR1; a second secondary winding SW2 is connected between junction Jy and the anode of a second commutating rectifier CR2; a third secondary winding SW3 is connected between junction Jx and the cathode of a third commutating rectifier CR3; and a fourth secondary winding SW4 is connected between junction Jx and the anode of a fourth commutating rectifier CR4. The cathodes of CR2 and CR4 are both connected with the B+ bus; and the anodes of CR1 and CR3 are both connected with the B− bus.

Saturable transformers STb and STc have tertiary windings STbt and STct; which tertiary windings are connected in series with each other and with a Diac Dt to form a series-combination; which series-combination is connected between junction Jt and the B− bus. Saturable transformer STb has an overload control winding STbo connected between the B− bus and a terminal Tbo.

A capacitor Ct is connected between the B+ bus and junction Jt, as is also a resistor Rt. A diode D1 is connected with its anode to junction Jt and with its cathode to junction Jab; and a diode D2 is connected with its cathode to junction Jt and with its anode to the B− bus. The assembly consisting of elements Rt, Ct, D1, D2 and Dt is referred-to as trigger circuit TC.

A field effect trasistor FET is connected with its drain to junction Jt and with its source to the B− bus. Its gate is connected to the anode of a Zener diode Z, whose cathode is connected with the cathode of a diode D3. The anode of D3 is connected with terminal Tbo. A resistor R1 is connected between the gate of FET and the B− bus, as is also a capacitor C1.

A first output terminal OT1 is connected with junction Jx; and a second output terminal OT2 is connected with junction Jz. A load means LM is connected across output terminals OT1 and OT2.

Explanation of Waveforms

Figure 2:
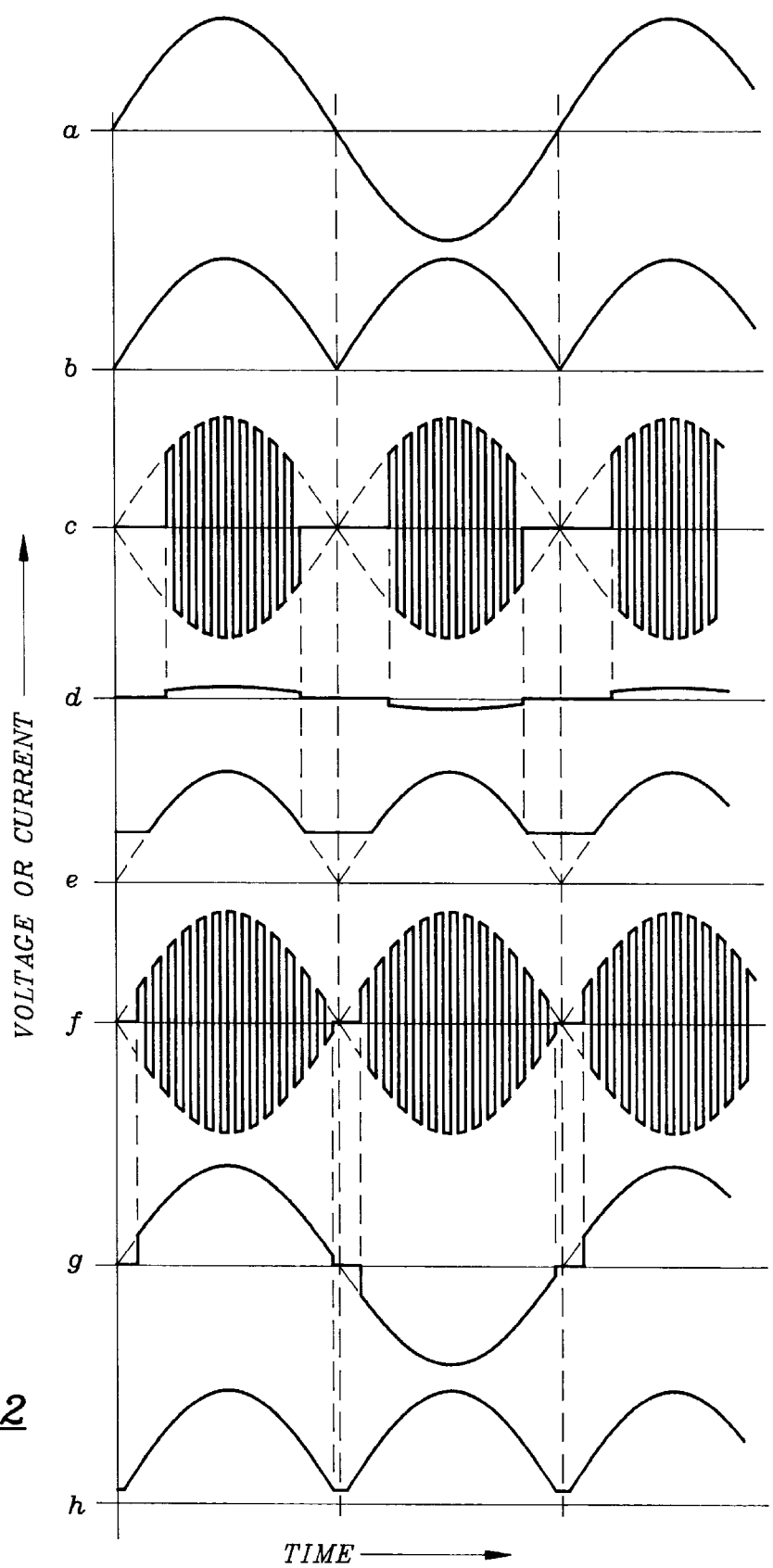
FIG. 2 shows typical low-frequency current and voltage waveforms associated with the circuit arrangement of FIG. 1.

FIG. 2 shows various typical low-frequency current and voltage waveforms associated with the circuit arrangement of FIG. 1.

FIG. 2a shows the waveform of the 120 Volt/60 Hz power line voltage provided from source S.

FIG. 2b shows the full-wave-rectified 120 Volt/60 Hz power line voltage.

FIG. 2c shows the low-frequency amplitude modulation of the high-frequency output voltage present across output terminals OT1 and OT2 under a condition of relatively light output loading.

FIG. 2d shows the waveshape of the current drawn from the power line under this condition of relatively light loading.

FIG. 2e shows the DC voltage present between the B+ bus and the B− bus under this condition of relatively light loading.

FIG. 2f shows the low-frequency amplitude modulation of the high-frequency output voltage present across output terminals OT1 and OT2 under a condition of relatively heavy output loading.

FIG. 2g shows the waveshape of the current drawn from the power line under this condition of relatively heavy loading.

FIG. 2h shows the DC voltage present between the B+ bus and the B− bus under this condition of relatively heavy loading.

Figure 3:
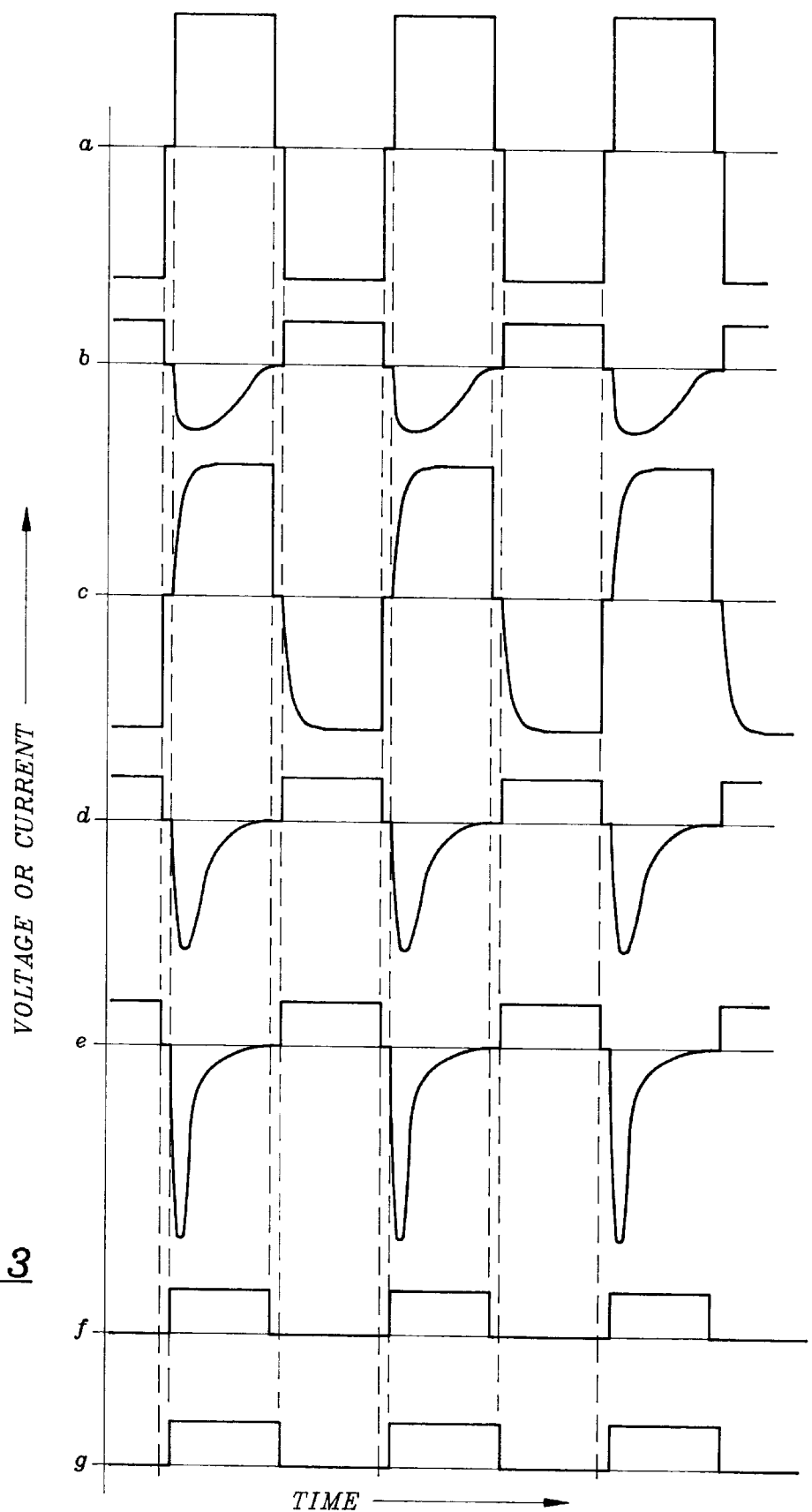
FIG. 3 shows typical high-frequency current and voltage waveforms associated with the circuit arrangement of FIG. 1.

FIG. 3 shows various typical high-frequency current and voltage waveforms associated with the circuit arrangement of FIG. 1 under the condition where the magnitude of the DC voltage between the B+ bus and the B− bus is at its maximum.

FIG. 3a shows the waveshape of the high-frequency output voltage across output terminals OT1 and OT2 under the condition of relatively light output loading.

FIG. 3b shows the base-emitter voltage of transistor Qb under the condition of relatively light output loading.

FIG. 3c shows the waveshape of the high-frequency output voltage across output terminals OT1 and OT2 under the condition of relatively heavy output loading.

FIG. 3d shows the base-emitter voltage of transistor Qb under the condition of relatively heavy output loading.

FIG. 3e shows the base-emitter voltage of transistor Qb under a condition of excessive output loading.

FIG. 3f shows the collector current of transistor Qc; and

FIG. 3g shows the collector current of transistor Qb under a condition where transistor Qc ceases to conduct a brief period before transistor Qb ceases to conduct.

Details of Operation

In its basic self-oscillating inverter function, the circuit arrangement of FIG. 1 operates similarly to that of U.S. Pat. No. 4,502,107 to Nilssen. However, in the details of operation, there are significant differences, as follows.

The inverter of FIG. 1 gets triggered into oscillation whenever the magnitude of the DC voltage between the B− bus and the B+ bus is high enough to support oscillation and if, at the same time, a trigger pulse is provided simultaneously to the two tertiary windings of saturable transformers STb and STc. Also, before self-oscillation can in fact occur, it is necessary that the load means be in fact connected.

Initial triggering will occur whenever resistor Rt has caused the magnitude of the voltage at junction Jt to reach the point where Diac Dt breaks down. Thereafter, the inverter will self-oscillate until the magnitude of the DC supply voltage drops to a level so low that self-oscillations can no longer be sustained.

As indicated in FIG. 2, the level to which the magnitude of the DC supply voltage must drop for oscillations to cease depends upon the degree of loading provided by the load means: the heavier the degree of loading, the lower the drop-out level; the lighter the degree of loading, the higher the drop-out level.

Of course, after the inverter drops out of oscillation, no DC load current will be drawn. Thus, due to the modest energy-storing capability of capacitor HFBC, from the moment the inverter ceases to oscillate, the magnitude of the DC supply voltage (i.e., the voltage between the B− bus and the B+ bus) will remain constant until the absolute instantaneous magnitude of the 120 Volt/60 Hz power line voltage increases enough to cause the magnitude of this DC supply voltage to increase.

Due to the particular arrangement of trigger circuit TC, the triggering will normally take place only after the magnitude of the DC supply voltage has increased by an amount equal to the breakdown voltage of Diac Dt. The purpose of resistor Rt is that of preventing "hang-up"; which could occur if for some reason the inverter were to have ceased to oscillate at or near the point of maximum-magnitude DC supply voltage. However, the magnitude of resistor Rt is so large that that it will have negligible effect during normal inverter operation. The presence of diode D2 will prevent the voltage at junction Jt from becoming negative. The presence of diode D1 will prevent trigger pulses from being provided after the inverter has started to oscillate.

Thus, under ordinary circumstances, as indicated by FIG. 2c and 2f, the bridge inverter of FIG. 1 will be triggered into oscillation near the beginning of each half-cycle of the 120 Volt/60 Hz power line voltage. Similarly, it will drop out of oscillation near the end of each such half-cycle. The exact points of triggering and drop-out being dependent upon the degree of loading at the inverter's output.

The fact that the inverter drops out of oscillation later in the half-cycle as the inverter's output loading increases, combined with the associated fact that it starts the oscillation at a correspondingly earlier point, results in a highly useful effect. That is: it results in a compensation for the drop-off in the RMS magnitude of the inverter output voltage that naturally occurs with increased inverter loading. Thus, a useful degree of regulation of RMS magnitude versus load is attained.

The purpose of transistor FET, which is connected between junction Jt and the B− bus, is that of stopping inverter oscillation (by way of preventing the generation of trigger pulses) in the event that the inverter were to be overloaded at its output. This function is attained by way of thresholded peak-rectification of the output voltage of overload-sensing winding STbo of saturable transformer STb; which thresholded peak-rectification is attained by way of diode D3 in combination with Zener diode Z and capacitor C1.

As the magnitude of the inverter output current increases, the magnitude of the peak reverse base-emitter voltage increases correspondingly, as indicated by FIG. 3b, 3d and 3e. After a certain level, pre-determined by the combined characteristics of the Zener diode and the FET transistor, the magnitude of the peak reverse base-emitter voltage becomes large enough to cause capacitor C1 to charge up sufficiently to cause the FET to become conductive; which, in turn, will prevent the magnitude of the DC voltage at junction Jt from reaching a level high enough to cause trigger pulses to be produced. After once having been made conductive, the FET will remain conductive until the charge on capacitor C1 is sufficiently reduced. The length of time required to sufficiently reduce the charge on capacitor C1 can readily be determined at will by suitable choice of the resistance value of resistor R1.

Thus, whenever a current of excessive magnitude is caused to flow from the inverter's output, the provision of trigger pulses ceases, thereby stopping inverter oscillation as well as preventing inverter overload.

Otherwise, the inverter exhibits the following salient functions and features.

The inverter's output current flows through load means LM as well as through primary winding PW of non-linear inductor means NLIM. This output current is established by way of alternating conduction of transistor-pairs Qa–Qd and Qc–Qb; which alternating conduction occurs at a rate of about 20 kHz.

To illustrate: toward the end of a given conduction cycle, a given transistor-pair is conducting, for instance transistor-pair Qc–Qb. Shortly thereafter, due to saturation of saturable transformer STc and subsequent exhaustion of its charge carriers, but before transistor Qb has ceased to conduct, transistor Qc abruptly ceases to conduct, thereby abruptly stopping the flow of output current. Yet, the magnetization of the non-linear inductor means—which had been established by the load current flowing through primary winding PW—can not disappear instantaneously. However, it may be maintained by transferring the associated ampere-turns from primary winding PW to one of the tightly coupled secondary windings. In this case, due to the direction of the load current combined with the polarities of the four commutating rectifiers CR1, CR2, CR3 and CR4 associated with the non-linear inductor means, only secondary windings SW2 and SW3 would be possible candidates for taking over the role of conducting the current that just ceased flowing through primary winding PW.

However, during the brief period after transistor Qc has stopped conducting and while transistor Qb still conducts, the magnitude of the voltage across transistor Qc substantially equals the full magnitude of the DC supply voltage while the magnitude of the voltage across transistor Qb remains low. Thus, commutating rectifier CR2 becomes reversely biased by the full magnitude of the DC supply voltage; and the only alternative available for discharging the ampere-turns of the non-linear inductor means is through commutating rectifier CR3; which therefore provides for a current (of magnitude equal to that of the load current just before it ceased to flow) to flow from the B− bus, through secondary winding SW3, through primary windings STap and STbp, into the collector of transistor Qb, through transistor Qb and back to the B− bus.

In other words, the ampere-turns stored in non-linear inductor means NLIM cause a current of magnitude equal to the load current to continue to flow into the collector of transistor Qb, thereby providing for the charge-carriers in the collector-base junction of that transistor to rapidly dissipate, which is to say: providing for that transistor rapidly to be rendered non-conductive.

After transistor Qb has become non-conductive, whatever inductive energy remains in the non-linear inductor means will rapidly discharge itself into capacitor HFBC by way of commutating rectifier CR3, secondary winding STas, and the base-collector junction of transistor Qa (and/or by way of commutating rectifier CR2, secondary winding STds, and the base-collector junction of transistor Qd).

In this connection it is noted that the polarity of the current flowing into capacitor HFBC from the non-linear inductor means by way of secondary winding STas is such as to cause already saturated transformer STa to become even more saturated. Thus, secondary winding STas offers no impedance against this flow of current.

Hence, after load current ceases to flow due to the cessation of conduction by transistor Qc, as long as transistor Qb keeps conducting, a current of magnitude equal to that of the load current (just before it ceased to flow) will continue to flow through transistor Qb. And, as a consequence of the particular topography of the circuit arrangement, the current flowing through transistor Qb will also flow through primary winding STap of saturable transformer STa; which will prevent transistor Qa from becoming conductive until after current has ceased flowing into the collector of transistor Qb.

A very important feature of the present invention relates to non-linear inductor means NLIM. Its purpose is that of storing inductive energy, and to use that inductive energy to help commutate the transistors in the particular manner described hereinabove.

However, the amount of energy stored by an ordinary linear inductor is proportional to the square of the magnitude of the current flowing through it; which implies that, if there be a substantial variation in the magnitude of the inverter's load current, there be a very much exaggerated variation in the amount of energy stored in the inductor. As a practical consequence in instant situation, if a linear inductor means were to be used instead of the non-linear inductor means, and if this linear inductor means were sized so as to cause the inverter circuit to perform properly at some minimum expected load level, then—at some substantially higher load level—the magnitude of the inductance of the inductor means would be larger than necessary and would cause an unacceptable degree of rounding of the output voltage waveshape, much more so than indicated by FIG. 3c. Thus, voltage-versus-load regulation might suffer severely with the use of a linear inductor means.

To mitigate the problem associated with the use of a linear inductor means, a non-linear inductor means is used herein; which non-linear inductor means is so made as to change its effective inductance with the magnitude of the current flowing through it. Ideally, the non-linear inductor means should have an effective inductance that decreases linearly with the magnitude of the current passing through it, thereby to cause the stored energy to be linearly proportional to the magnitude of the current, as opposed to being proportional to the square of the magnitude of the current.

In reality, non-linear inductor means NLIM is made by using a few turns of wire on a gapped ferrite pot-core used well beyond its flux saturation limits. In particular, for a situation where the minimum load is a 25 Watt incandescent lamp means and the maximum load is a 500 Watt incandescent lamp means, the non-linear inductor means is made by 20 turns of stranded copper wire on a Ferroxcube 3C8-2213 ferrite pot-core with a 5 mil gap. At a saturation flux density of about 4000 Gauss, saturation occurs at about 3.5 Ampere (i.e., 70 Ampere-turns); beyond which point effective inductance significantly decreases.

Thus, at minimum load levels, the effective inductance is substantially larger than it is at maximum load levels.

Additional Comments (a) With respect to the waveform of FIGS. 2c and 2f, and for a given type of inverter transistors, it is noted that the points at which the self-oscillating inverter drops out of oscillation is principally determined by the turns-ratio and the magnetization characteristics of the (identical) saturable feedback transformers STa, STb, STc and STd, as well as by the resistance values of the (identical) base-emitter resistors Ra, Rb, Rc and Rd.

The proper turns-ratio is principally determined by the amount of base drive needed for best efficiency under maximum load conditions; which in instant situation was chosen to be a primary-to-secondary turns-ratio of 1:4.

The proper minimum resistance values for the base-emitter resistors may best be determined by the minimum load at which it is desired for the inverter to be able to sustain self-oscillation at a given magnitude of DC supply voltage. In instant circuit arrangement, the resistance values were so chosen as to cause self-oscillation to cease at a magnitude of about 75 Volt for the DC supply voltage for the minimum load level of 25 Watt. As a result of that choice, self-oscillation sustained down to a magnitude of less than 10 Volt for the DC supply voltage for the maximum load level of 500 Watt.

The magnetization characteristics of the saturable transformers were determined by a desire to keep the oscillation frequency substantially constant over the total range of loading. As a result, to compensate for the modest increase in base-emitter voltage resulting from increased base drive (which automatically occurs at higher load levels and which therefore has a tendency to cause the frequency of oscillation to increase at higher load levels), the saturable transformers were so arranged as to exhibit a gradually increasing magnetization current prior to full saturation; which characteristic may be obtained by suitable choice of ferrite material in the cores of the saturable transformers and/or by providing for the equivalent of a very small air-gap in each of these ferrite cores. (The saturable transformers of the preferred embodiment were wound on Ferroxcube Series 1041 Toroid Cores made of 3E2A ferrite material.)

However, it is emphasized that there is a fairly high degree of interaction between the different parameters and effects enunciated above; and the final choice of parameters and effects might best be found by way of multiple iterations.

(b) The amount of Volt-seconds required of non-linear inductor means NLIM to provide in order to effectuate proper transistor switching, depends principally on the following factors: i) variability between transistors with respect to storage time; ii) variability between saturable transformers with respect to saturation characteristics; and iii) variability between transistors with respect to the magnitude of the base-emitter voltage as function of base current.

(c) It is readily possible to make the circuit of FIG. 1 operate with high efficiency even without use of the secondary windings on non-linear inductor means NLIM. However, in this case it would be necessary to provide for a substantially higher degree of energy-storage, which implies a larger and more costly inductor. Moreover, the feature of inductor non-linearity would now become even more important.

Without the use of secondary windings on non-linear inductor means NLIM, circuit operation will be quite different. For instance, if the Qc-transistor were to suddenly cease to conduct while the Qb-transistor remained in a conductive mode, the inductor current would continue to flow. However, in this case, it would flow from the B− bus, through secondary winding STds, through the base-collector junction of the Qd-transistor, through primary windings STdp and STcp, through the main winding of non-linear inductor means NLIM, through the load, through primary windings STap and STbp, into the collector of the Qb-transistor and back to the B− bus.

Thus, the inductive current used for flushing out the charge carriers in the collector-base junction of the Qb-transistor now has to flow through the load means; which implies that a far larger Volt-second product (and correspondingly larger amount of energy) has to be provided from the non-linear inductor means as compared with the case when using the four secondary windings and their associated commutating rectifiers.

(d) It is noted that the magnitude of the average voltage present across each of the primary windings of staturable transformers STa, STb, STc and STd is but a small fraction of one Volt. Thus, for practical purposes, the potential at junction Jab is the same as the potential at junction Jx; and the potential at junction Jcd is the same as the potential at junction Jy.

(e) In the non-linear inductor means NLIM, the relationship between the magnitude of the current flowing through the inductor's main winding (i.e., the amount of Ampere-turns provided) and the magnitude of the magnetic flux resulting therefrom is less-than-proportional. Thus, as the magnitude of the current increases, the effective inductance decreases.

(f) It is believed that the present invention and its several attendant advantages and features will be understood from the preceeding description. However, without departing from the spirit of the invention, changes may be made in its form and in the construction and interrelationships of its component parts, the form herein presented merely representing the preferred embodiment.

I claim:

1. In an arrangement comprising:
a conditionally self-oscillating inverter connected with a source of DC voltage periodically varying in magnitude with a relatively long period; the inverter being operative to provide correspondingly periodic intermittent bursts of high-frequency current to a load, but only as long as being provided with a manifest trigger action for each relatively long period, the high-frequency current having a relatively short period;
the improvement comprising:
control circuit connected with the inverter and operative: (i) to sense the magnitude of the high-frequency current, and (ii) in response to the magnitude of the high-frequency current, to prevent the provision of the said manifest trigger action for at least one of said relatively long periods after the magnitude has exceeded predetermined level.

2. An arrangement comprising:
a conditionally self-oscillating inverter connected with a source of DC voltage periodically varying in magnitude with a relatively long period; the inverter being connected with a load and operative to provide correspondingly periodic intermittent bursts of high-frequency current thereto, but only as long as being provided with a manifest trigger action at a point in time within each relatively long period, the high-frequency current having a relatively short period; and
control circuit connected with the inverter and operative: (i) to sense the magnitude of the high-frequency current, and (ii) in response to the magnitude of the high-frequency current, to adjust the point in time at which said manifest trigger action is provided.

3. The arrangement of claim 2 wherein the control circuit is so disposed as to cause the point in time to occur earlier with increasing magnitude of the high-frequency current.

4. In an inverter adapted to be connected with a source of DC voltage and operative to provide from an inverter output an alternating current to a load means; the inverter having a first and a second pair of transistors; each transistor of a given pair of transistors being substantially identical to the other transistor thereof; a given pair of transistors being defined as being conductive only when both of its transistors are conductive; the two pairs of transistors being rendered conductive in alternating manner; the first pair of transistors having an X-transistor and a Y-transistor; the improvement comprising:
circuitry connected within the inverter and functional to cause the Y-transistor to remain conductive for a brief period of time after the X-transistor has been rendered non-conductive, irrespective of any ordinary differences in the parameters of the two transistors.

5. In an inverter adapted to be connected with a source of DC voltage and operative to provide from an inverter output an alternating current to a load means; the inverter having a first and a second pair of transistors; a given pair of transistors being defined as being conductive only when both of its transistors are conductive; the two pairs of transistors being rendered conductive in alternating manner; the first pair of transistors having an X-transistor and a Y-transistor; the improvement comprising:
circuitry connected within the inverter and functional to cause the Y-transistor to remain conductive for a brief period of time after the X-transistor has been rendered non-conductive, irrespective of any non-unusual differences in the parameters of the two transistors; the duration of this brief period of time being of material consequence in the functioning of the inverter.

6. In an inverter adapted to be connected with a source of DC voltage and operative to provide from an inverter output an alternating current to a load means; the inverter having a first and a second pair of transistors; a given pair of transistors being defined as being conductive only when both of its transistors are conductive; the two pairs of transistors being rendered conductive in alternating manner; the first pair of transistors having an X-transistor and a Y-transistor; the improvement comprising:
circuitry connected within the inverter and functional to cause the Y-transistor to remain conductive for a brief period of time after the X-transistor has been rendered non-conductive, irrespective of any ordinarily expected differences in the parameters of these two transistors, and even if all material characteristics of the Y-transistor were to be identical to those of the X-transistor.

7. The improvement of claim 6 wherein said circuitry is further characterized by providing periodically for a short period of time during which neither one of the two pairs of transistors is conductive.

8. The improvement of claim 6 wherein the inverter is further characterized by being self-oscillating.

9. An arrangement comprising:
a source of AC power line voltage;
a load;
a rectifier circuit connected with the source and operative to provide a DC supply voltage at a DC output; and
an inverter circuit connected with the DC output and functional to provide a high-frequency AC output voltage at an inverter output; the inverter output being connected with the load thereby to supply a load current thereto; the high-frequency AC output voltage being of frequency substantially higher than that of the AC power line voltage; the inverter circuit being characterized by having four transistors connected in bridge inverter configuration; the four transistors including two separate pairs of transistors; each individual transistor of each pair of transistor being periodically both conductive at the same time, but never while one of the transistors of the other pair of transistors is conductive; the high-frequency AC output voltage being characterized by being amplitude-modulated such as to have a peak-to-peak amplitude that periodically varies between a maximum level and a minimum level; the maximum level being substantially larger than the minimum level.

10. The arrangement of claim 9 wherein the amplitude of the maximum level is at least twice as high as the amplitude of the minimum level.

11. The arrangement of claim 9 wherein: (i) the high-frequency inverter output voltage has a fundamental cycle period and a waveshape; (ii) the high-frequency load current has an RMS magnitude; and (iii) the inverter circuit is further characterized by including circuitry functional to cause the waveshape of the high-frequency inverter output voltage to change as a function of the RMS magnitude of the high-frequency load current.

12. An arrangement comprising:
a source of AC power line voltage;
a rectifier circuit connected with the source and operative to provide a DC supply voltage between a negative DC output terminal and a positive DC output terminal; and
an inverter circuit having a negative and a positive DC input terminal and a pair of inverter output terminals; the inverter circuit:
(a) having its negative and positive DC input terminals connected with the negative and positive DC output terminals, respectively;
(b) being functional to provide a high-frequency AC output voltage at the inverter output terminals; the high-frequency output voltage being of frequency substantially higher than that of the AC power line voltage;
(c) including two transistors, each having a negative terminal, a positive terminal, and a control input terminal; the two transistors being connected in circuit between the negative and positive DC input terminals in such manner that (i) the negative terminal of one of the two transistors is connected with the negative DC input terminal, and (ii) the positive terminal of the other one of the two transistors is connected with the positive DC input terminal; and
(d) having circuitry connected with the transistor terminals and operative to cause the transistors to conduct periodically and in such manner that the one transistor conducts for a longer period than does the other transistor, irrespective of any non-unusual differences between the parameters of the two transistors.

13. The arrangement of claim 9 wherein said high-frequency voltage has a waveshape substantially equal to that of a squarewave.

14. An arrangement comprising:
a source of AC power line voltage;
a load;
a rectifier circuit connected with the source and operative to provide a DC supply voltage at a DC output; and
an inverter circuit connected with the DC output and functional to provide a high-frequency AC output voltage at an inverter output; the inverter output being connected with the load thereby to supply a load current thereto; the high-frequency AC output voltage being of frequency substantially higher than that of the AC power line voltage; the inverter circuit including four transistors connected in bridge configuration; the high-frequency AC output voltage being amplitude-modulated such as to have a peak-to-peak amplitude that varies periodically between a maximum level and a minimum level; the maximum level being substantially larger than the minimum level.

15. An arrangement comprising:
a source of relatively low frequency AC voltage;
a load;
a rectifier circuit connected with the source of AC voltage and operative to provide a DC supply voltage at a DC output; and
an inverter circuit connected with the DC output and functional to provide a relatively high frequency voltage at an inverter output; the inverter output being connected with the load thereby to supply a load current thereto; the inverter circuit having four transistors connected in a bridge configuration; the high-frequency voltage being amplitude-modulated such as to have a peak-to-peak amplitude that varies periodically between a maximum level and a minimum level; the maximum level being larger than the minimum level by a factor of at least 1.5.

16. The arrangement of claim 15 wherein the high frequency voltage includes individual cycles, each such individual cycle having a waveshape substantially equal to that of a squarewave.

17. The arrangement of claim 15 wherein the four transistors include two separate pairs of transistors; each individual transistor of each pair of transistor being periodically both conductive at the same time, but not while one of the transistors of the other pair of transistors is conductive.

18. An arrangement comprising:
a source of AC power line voltage;
a rectifier circuit connected with the source and operative to provide a DC supply voltage at a DC output; and
an inverter circuit connected with the DC output and functional to provide a high-frequency amplitude-modulated output voltage at an inverter output; the high-frequency output voltage, including individual cycles of substantially squarewave-shaped voltage; each cycle of squarewave-shaped voltage having a cycle period; the high-frequency voltage having a fundamental frequency above 5 kHz; the inverter circuit including two transistors, both of which are simultaneously non-conductive for at least a small part of said cycle period.

19. The arrangement of claim 18 wherein the high-frequency voltage consists of periodic individual bursts of high-frequency voltage; each individual burst including multiple individual cycles of substantially squarewave-shaped voltage.

20. The arrangement of claim 19 wherein the individual bursts are separated from each other by a short period during which said individual cycles of substantially squarewave-shaped voltage are not provided.

21. The arrangement of claim 18 wherein a resistive load is connected directly across the inverter output.

22. An arrangement comprising:

an inverter connected with a source of DC voltage periodically varying in magnitude at a low frequency with a correspondingly long period; the inverter being connected with a load and operative to provide periodic intermittent bursts of high-frequency current thereto, but only as long as being provided with a manifest trigger action at a point in time within each long period; the bursts of high-frequency current occurring at said low frequency; the fundamental frequency of the high-frequency current being more than ten times higher than said low frequency; and a controller connected with the inverter and operative: (i) to sense the magnitude of the high-frequency current, and (ii) in response thereto, to control the magnitude of the high-frequency current.

23. The arrangement of claim 22 wherein the inverter includes two series-connected transistors.

24. An arrangement comprising:

a source of AC power line voltage;

a rectifier circuit connected with the source and operative to provide a DC supply voltage between a B– terminal and a B+ terminal; and an inverter circuit connected with the DC output and functional to provide a high-frequency voltage at an inverter output; the high-frequency voltage being amplitude-modulated such as to have peak-to-peak magnitude that periodically varies between a first level and a second level that is substantially lower than the first level; the high-frequency output voltage, as long as indeed provided, including individual cycles of substantially squarewave-shaped voltage; each cycle of squarewave-shaped voltage having a cycle period; the high-frequency voltage having a fundamental frequency higher than 5 kHz; the inverter circuit including two transistors, both of which are simultaneously conductive for at least a small part of said cycle period; one transistor having a collector connected to the B+ terminal; the other transistor having an emitter connected to the B– terminal.

25. An arrangement comprising:

a source of AC power line voltage;

a rectifier circuit connected with the source and operative to provide a DC supply voltage between a B– terminal and a B+ terminal; and an inverter circuit connected with the DC output and functional to provide a high-frequency voltage at an inverter output; the high-frequency voltage being amplitude-modulated such as to have peak-to-peak magnitude that periodically varies between a first level and a second level that is substantially lower than the first level; the high-frequency output voltage, as long as indeed provided, including individual cycles of substantially squarewave-shaped voltage; each cycle of squarewave-shaped voltage having a cycle period; the high-frequency voltage having a fundamental frequency higher than 5 kHz; the inverter circuit including two transistors, both of which are simultaneously non-conductive for at least a small part of said cycle period; one transistor having a collector connected to the B+ terminal; the other transistor having an emitter connected to the B– terminal.

* * * * *